United States Patent
Yen

(10) Patent No.: US 8,988,046 B2
(45) Date of Patent: Mar. 24, 2015

(54) ELECTRONIC DEVICE USING RECHARGEABLE BATTERIES AND BATTERY STATUS CONTROL METHOD APPLICABLE THERETO

(75) Inventor: Wei-Ting Yen, Taipei (TW)

(73) Assignee: Quanta Computer Inc., Tao Yuan Shien (TW)

( * ) Notice: Subject to any disclaimer, the term of this patent is extended or adjusted under 35 U.S.C. 154(b) by 821 days.

(21) Appl. No.: 13/206,760

(22) Filed: Aug. 10, 2011

(65) Prior Publication Data

US 2012/0286737 A1 Nov. 15, 2012

(30) Foreign Application Priority Data

May 11, 2011 (TW) .............................. 100116551 A

(51) Int. Cl.
*H02J 7/00* (2006.01)
*H01M 10/44* (2006.01)

(52) U.S. Cl.
CPC ........... *H01M 10/441* (2013.01); *H02J 7/0013* (2013.01); *H01M 10/443* (2013.01)
USPC .......................................... 320/134; 320/150

(58) Field of Classification Search
CPC ..... H02J 7/0013; H02J 7/047; H01M 10/441; H01M 10/443
USPC .................................. 320/126, 134, 150, 153
See application file for complete search history.

(56) References Cited

U.S. PATENT DOCUMENTS

2006/0238165 A1* 10/2006 Moore et al. .................. 320/118
2007/0080662 A1* 4/2007 Wu ............................... 320/110

FOREIGN PATENT DOCUMENTS

| CN | 1417915 A | 5/2003 |
| TW | 538573 B | 6/2003 |

* cited by examiner

*Primary Examiner* — Edward Tso
*Assistant Examiner* — Aaron Piggush
(74) *Attorney, Agent, or Firm* — Rabin & Berdo, P.C.

(57) ABSTRACT

An electronic device includes: a plurality of parallel-connection battery groups; and a plurality of battery balance circuits, respectively coupled to the parallel-connection battery groups, when the parallel-connection battery group has a temperature over a predetermined temperature range, the battery balance circuit performs a thermal balance operation on the parallel-connection battery group so that the temperature of the parallel-connection battery group returns into the predetermined temperature range.

5 Claims, 4 Drawing Sheets

ELECTRONIC DEVICE USING RECHARGEABLE BATTERIES AND BATTERY STATUS CONTROL METHOD APPLICABLE THERETO

This application claims the benefit of Taiwan application Serial No. 100116551, filed May 11, 2011, the subject matter of which is incorporated herein by reference.

TECHNICAL FIELD

The disclosure relates in general to an electronic device using rechargeable batteries, which detects a temperature status of the rechargeable batteries to control charging operations on the rechargeable batteries.

BACKGROUND

Electronic devices, such as notebook computers, portable electronic devices or even electronic cars, electronic motor bikes, electronic bikes, have many battery groups for providing power. The battery groups are connected serially or parallel.

Battery balance is an important issue to an electronic device having many battery groups connected in serial or in parallel. If battery balance is not achieved between batteries, then the batteries are hazardous, will age quickly, and need to be replaced often. However, the replacement of batteries would arise an issue of environmental conservation.

In general, some factors would affect the balance between batteries, namely, impedance, aging, temperature, placement, static voltage/current and dynamic voltage/current. Among the above factors, the battery temperature balance is most important. If the battery temperature factor is under good control, other factors will be properly controlled. Thus, how to reach a thermal balance between batteries has become a task for the industries.

BRIEF SUMMARY

The disclosure is directed to an electronic device using rechargeable batteries and a battery status control method thereof. The temperature status of the rechargeable batteries is detected to achieve a thermal balance between the batteries and accordingly charging operations on the batteries are controlled.

According to an example of the present disclosure, an electronic device is disclosed. The electronic device includes a plurality of parallel-connection battery groups and a plurality of battery balance circuits respectively coupled to the parallel-connection battery groups. When the parallel-connection battery group has a temperature over a predetermined temperature range, the battery balance circuit performs a thermal balance operation on the parallel-connection battery group, so that the temperature of the parallel-connection battery group is back into the predetermined temperature range.

According to another example of the present disclosure, a battery status control method applicable to an electronic device is disclosed. The method includes: detecting respective temperatures of a plurality of parallel-connection battery groups; performing a thermal balance operation on the parallel-connection battery group when the parallel-connection battery group has a temperature over a predetermined temperature range, so that the temperature of the parallel-connection battery group is back into the predetermined temperature range; and controlling a charging operation on the parallel-connection battery groups according to temperature detection results of the parallel-connection battery groups.

It is to be understood that both the foregoing general description and the following detailed description are exemplary and explanatory only and are not restrictive of the disclosed embodiments, as claimed.

DETAILED DESCRIPTION OF THE DISCLOSURE

Figure 1:
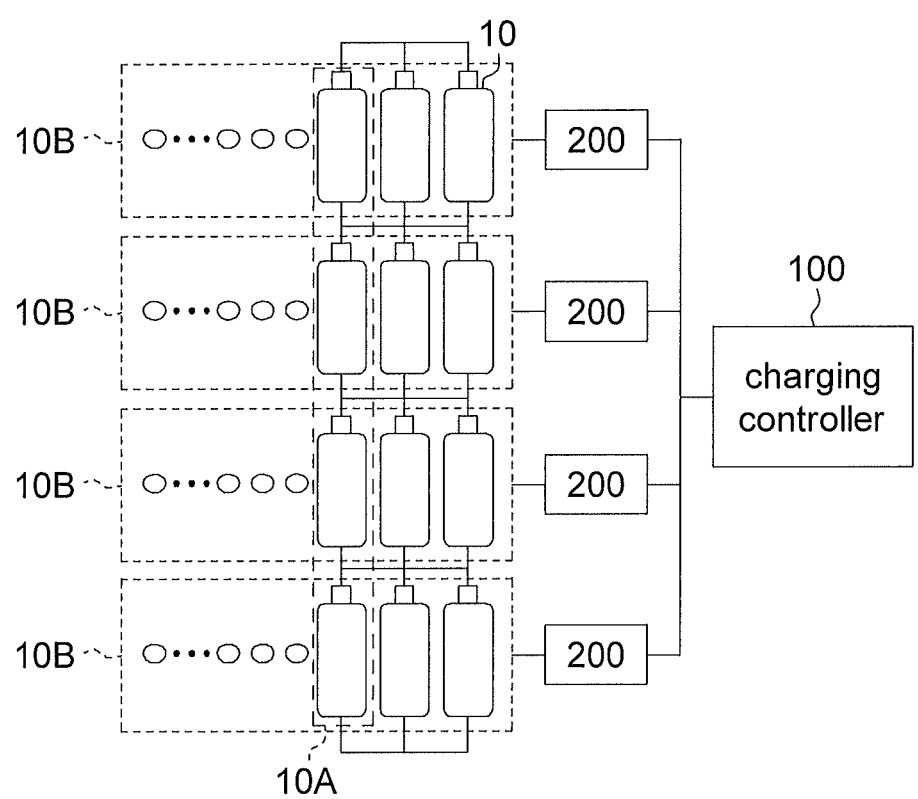
FIG. 1 shows a schematic diagram according to an embodiment of the disclosure.

FIG. 1 shows a schematic diagram of an electronic device using rechargeable batteries according to an embodiment of the disclosure. FIG. 1 shows the serial-connection/parallel-connection between the rechargeable batteries. In the disclosure below, the batteries 10 in serial-connection are referred as "serial-connection battery group" denoted by the designation 10A as indicated in FIG. 1, and the batteries 10 in parallel-connection are referred as "parallel-connection battery groups" denoted by the designation 10B as indicated in FIG. 1. Each parallel-connection battery group 10B is further coupled to a corresponding battery balance circuit 200. All battery balance circuits 200 are coupled to a charging controller 100. The battery balance circuit 200 makes the parallel-connection battery group 10B to reach a thermal balance. The charging controller 100 controls charging operations on all parallel-connection battery groups 10B according to detection results of the battery balance circuits 200.

In electronic devices such as 3C devices or electrical vehicles (electrical cars, electrical motor bikes, electrical bikes, and so on), the batteries are serial connected to provide a charging voltage of 16.8V. In general, four serial-connection battery units 10 (assuming each battery unit provides a voltage of 4.2V) output a voltage of 16.8V. There are twelve battery units 10 illustrated in FIG. 1. However the disclosure is not limited to such exemplification, and the number of battery units 10 may be increased or decreased according to actual needs.

Figure 2:
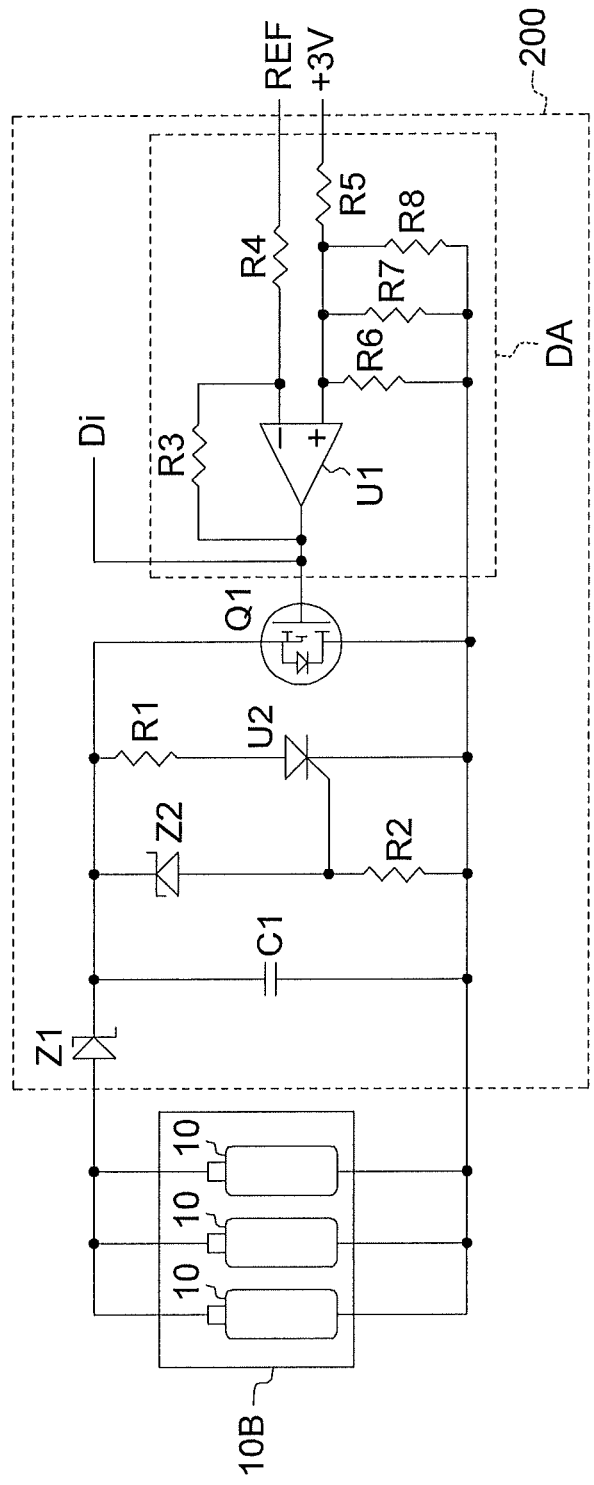
FIG. 2 shows a schematic diagram of a battery balance circuit according to the embodiment of the disclosure.

FIG. 2 shows a schematic diagram of the battery balance circuit according to the embodiment of the disclosure. As indicated in FIG. 2, the battery balance circuit 200 of the embodiment of the present disclosure is coupled to one of the parallel-connection battery groups 10B. In the example of FIG. 1, there are four parallel-connection battery groups illustrated, and four battery balance circuits 200 are thus required.

The battery balance circuit 200 at least includes two Zener diodes Z1~Z2, a capacitor C1, a silicon controlled rectifier U2, eight resistors R1~R8, a transistor Q1 and an amplifier U1. The amplifier U1 and the resistors R3~R8 form a differential amplifier (DA).

In the present disclosure, a predetermined temperature range is set. When the parallel-connection battery group has a temperature over the predetermined temperature range, the battery balance circuit 200 controls the temperature of the parallel-connection battery group to reach a thermal balance (that is, trying to control the temperature of the parallel-connection battery groups to be within the predetermined temperature range). To the contrary, if the temperature of the parallel-connection battery group is not over the predetermined temperature range, then the battery balance circuit 200 does not need to perform thermal balance. Regardless whether the battery balance circuit 200 performs the thermal balance operation or not, the battery balance circuit 200 does not affect other parallel-connection battery groups.

When the parallel-connection battery group 10B has a temperature over the predetermined temperature range (that is, the temperature is too high), the battery balance circuit 200 is open-looped so as to achieve a thermal balance. Under such circumstances, the Zener diode Z2 enters a breakdown region, the current outputted from the battery flows through the resistor R1 to trigger the gate of the silicon controlled rectifier U2 so that the anode and the cathode thereof are mutually conducted. Since the resistor generates heat and is a power consumption material, the energy of the parallel-connection battery group 10B will be consumed on the resistor R1 to lower the temperature so as to reach a thermal balance. The term "to reach a thermal balance" refers to the temperature of the parallel-connection battery group 10B back to be within the predetermined temperature range (that is, the temperature is moderate). As indicated in FIG. 2, when the battery balance circuit 200 executes the thermal balance operations, the current outputted from the battery flows through the path: Z1→R1→U2. Under such circumstances, different parallel-connection battery groups are not subjected to mutual influence.

When the parallel-connection battery groups 10B reach the thermal balance, the transistor Q1 will be cut off, so the current outputted from the battery flows through the body diode of the transistor Q1. As indicated in FIG. 2, after the battery balance circuit 200 has completed the thermal balance operation, the current outputted from the battery flows through the path: Z1→Q1. That is, after the battery balance circuit 200 has completed thermal balance operation, the battery balance circuit 200 will form a close loop, and different parallel-connection battery groups are not subjected to mutual influence.

The resistor R4 is a thermal resistor of each battery group, and the placement of the resistor R4 relates to a worst case about the parallel-connection battery groups. The resistor R4 is connected to a reference point REF shared by all parallel-connection battery groups. That is, all parallel-connection battery groups are connected to the reference point REF. The resistor R5 is connected to an external voltage used as a comparison reference value. If the resistors R6~R8 are adjusted, the predetermined temperature range of the parallel-connection battery groups may be adjusted. In addition, the resistance of the resistors may be controlled by a variable resistor controller or a regulator. The Zener diode Z1 prevents the occurrence of current reversion.

When the parallel-connection battery group 10B has a temperature over the predetermined temperature range, the amplifier U1 outputs a logic signal "1". When the parallel-connection battery group 10B has a temperature within the predetermined temperature range, the amplifier U1 outputs a logic signal "0". The logic signal outputted from the amplifier U1 is input to the D-type flip flop Di, wherein "i" is a positive integer, i=0~3 (in the example of FIG. 1).

Figure 3:
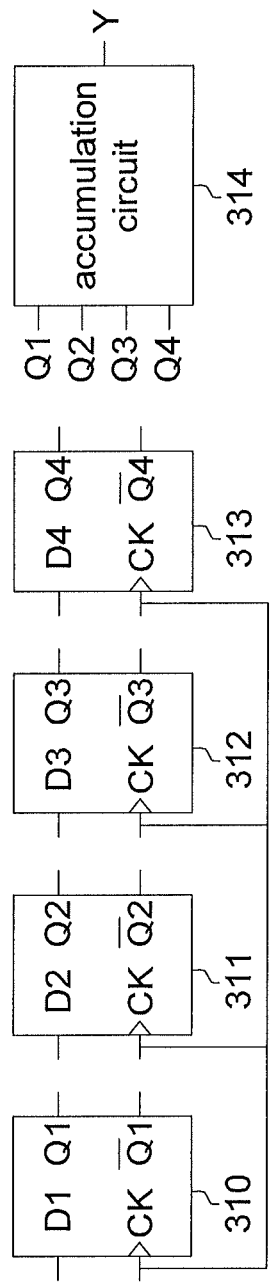
FIG. 3 shows a counting accumulation according to the embodiment of the disclosure.

Referring to FIG. 3, a schematic diagram of a counter accumulation according to the embodiment of the disclosure is shown. As indicated in FIG. 3, the four input pins D1~D4 of the D-type flip flop counters 310~313 are coupled to the logic signals outputted from the battery balance circuits 200. The four output pins Q1~Q4 of the D-type flip flop counters 310~313 are input to the accumulation circuit 314 for accumulation. Table 1 shows a truth table of an accumulation result of the accumulation circuit 314.

TABLE 1

| Q1 | Q2 | Q3 | Q4 | Y |
|----|----|----|----|---|
| 0 | 0 | 0 | 0 | 0 |
| 0 | 0 | 0 | 1 | 1 |
| 0 | 0 | 1 | 0 | 1 |
| 0 | 0 | 1 | 1 | 2 |
| 0 | 1 | 0 | 0 | 1 |
| 0 | 1 | 0 | 1 | 2 |
| 0 | 1 | 1 | 0 | 2 |
| 0 | 1 | 1 | 1 | 3 |
| 1 | 0 | 0 | 0 | 1 |
| 1 | 0 | 0 | 1 | 2 |
| 1 | 0 | 1 | 0 | 2 |
| 1 | 0 | 1 | 1 | 3 |
| 1 | 1 | 0 | 0 | 2 |
| 1 | 1 | 0 | 1 | 3 |
| 1 | 1 | 1 | 0 | 3 |
| 1 | 1 | 1 | 1 | 4 |

The embodiment of the present disclosure takes into consideration that when the battery is charged/discharged, the voltage and resistance may be different for each battery of the parallel-connection battery group under thermal balance, and if the battery is in full capacity for a long time, the lifespan of the battery will be shortened. In general, the lifespan of the battery will be almost doubled if the battery is in 85% power capacity. Thus, if one of the battery balance circuits outputs a logic signal "1", then a charge voltage is decreased by 1 step automatically during charging. Suppose the original full charging voltage is 4.2V (the full charging voltage refers to the charging voltage used for charging the battery to the full capacity). When the charging voltage is decreased by 1 step, the charging voltage becomes 4.15V (i.e. per step equals 0.05V).

As indicated in FIG. 1, there are four parallel-connection battery groups. When the four battery balance circuits corresponding to the four parallel-connection battery groups concurrently output logic signals "1", then the charging voltage is decreased by 4 steps (for example the charging voltage becomes 4.0V). Suppose originally there were four battery balance circuits concurrently outputting a logic signal "1", but later on, one battery balance circuit outputs a logic signal "0" (the remaining three battery balance circuits still output a logic signal "1"), then the charging voltage is decreased by 3 steps and becomes 4.05V.

Figure 4:
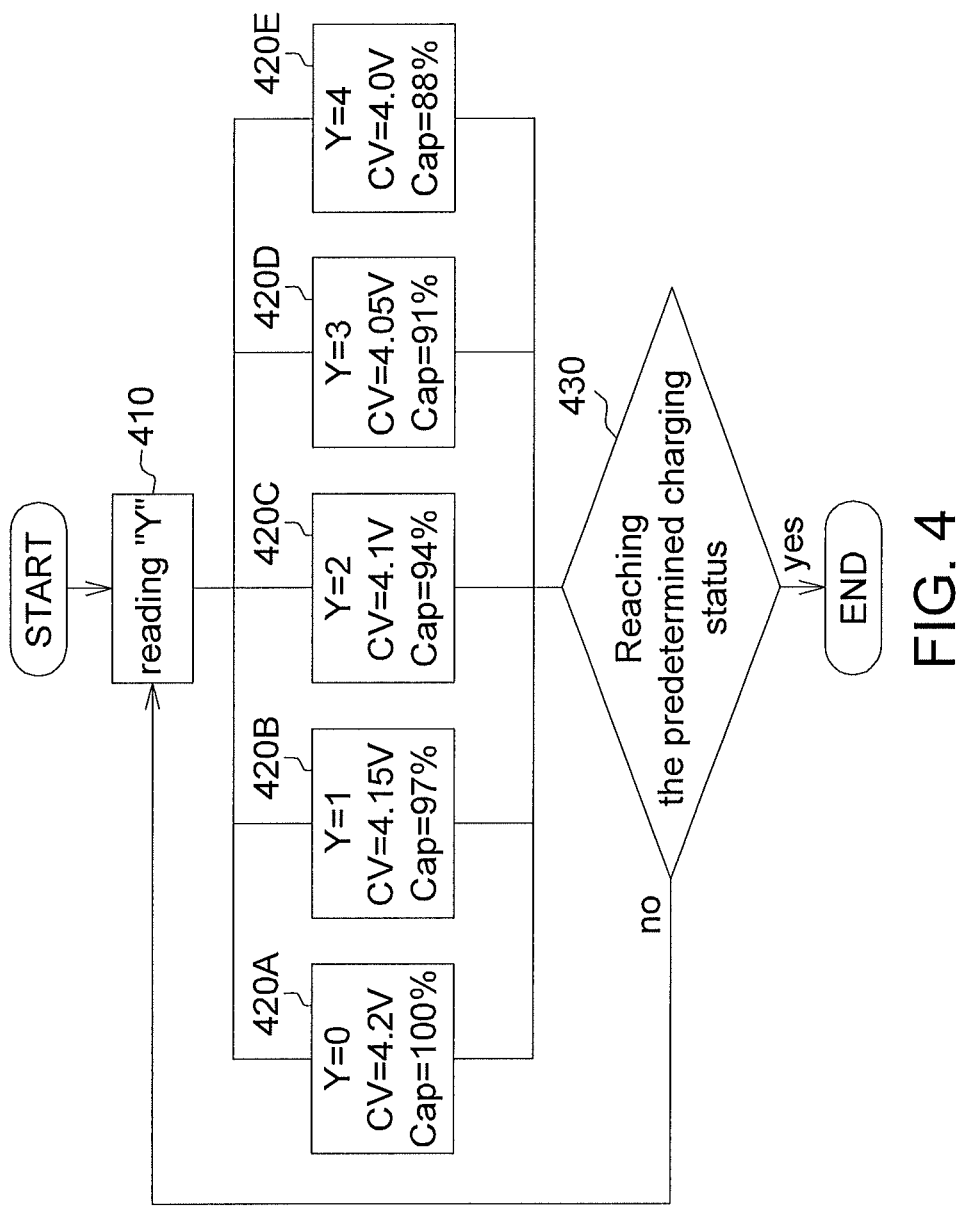
FIG. 4 shows a flowchart of charging control according to the embodiment of the disclosure.

FIG. 4 shows a flowchart of charging control according to the embodiment of the disclosure. As indicated in FIG. 4, in step 410, a Y value is read. The charging voltage and the battery charging status (cap) are set according to the Y value. In greater details, in step 420A, Y=0, so the charging voltage equals 4.2V, and the cap is set as 100%. That is, if Y=0, a charging voltage of 4.2V is applied to a single parallel-connection battery group, and the batteries of the parallel-connection battery group are charged to 100% power capacity. If there are N parallel-connection battery groups, the charging voltage equals 4.2V*N, and other scenarios can be obtained by analogy.

In step 420B, Y=1, so the charging voltage equals 4.15V, and the cap is set as 97%. In step 420C, Y=2, so the charging voltage equals 4.1V, and the cap is set as 94%. In step 420C, Y=3, so the charging voltage equals 4.05V, and the cap is set as 91% capacity. In step 420D, Y=4, so the charging voltage equals 4.0V, and the cap is set as 88% capacity.

In step 430, whether the battery has been charged to a predetermined charging status is determined. For example, whether the battery capacity has reached a predetermined cap is determined. If so, then the charging control process completes; otherwise, the process returns to step 410. The flowchart of FIG. 4 is performed by the charging controller 100 of FIG. 1.

It will be appreciated by those skilled in the art that changes could be made to the disclosed embodiments described above without departing from the broad inventive concept thereof. It is understood, therefore, that the disclosed embodiments are not limited to the particular examples disclosed, but is intended to cover modifications within the spirit and scope of the disclosed embodiments as defined by the claims that follow.

What is claimed is:

1. An electronic device, comprising:
   a plurality of parallel-connection battery groups; and
   a plurality of battery balance circuits respectively coupled to the parallel-connection battery groups, wherein when the parallel-connection battery group has a temperature over a predetermined temperature range, the battery balance circuit performs a thermal balance operation on the parallel-connection battery group, so that the temperature of the parallel-connection battery group is back into the predetermined temperature range;
   wherein each battery balance circuit comprises:
   a first Zener diode coupled to the parallel-connection battery group,
   a second Zener diode coupled to the first Zener diode,
   a first resistor and a silicon controlled rectifier coupled to the first Zener diode,
   a transistor coupled to the first Zener diode, and
   a differential amplifier coupled to the transistor for detecting whether the temperature of the parallel-connection battery group is over the predetermined temperature range, wherein
      when the temperature of the parallel-connection battery group is over the predetermined temperature range, the second Zener diode enters a breakdown region, a battery current flows through the first Zener diode and the first resistor to trigger and turn on the silicon controlled rectifier, and energy of the parallel-connection battery group is consumed on the first resistor to lower the temperature so as to achieve a thermal balance, and
      when the parallel-connection battery group reaches a thermal balance, the transistor is cut off, so that the battery current flows through a body diode of the transistor.

2. The electronic device according to claim 1, wherein, when the parallel-connection battery group has the temperature over the predetermined temperature range, the battery balance circuit is in an open-loop status.

3. The electronic device according to claim 1, further comprising:
   a plurality of counters coupled to the battery balance circuits for counting detection results of the battery balance circuits; and
   an accumulation circuit coupled to the counters for accumulating counting results of the counters.

4. The electronic device according to claim 3, further comprising:
   a charging controller coupled to the accumulation circuit, for controlling a charging operation on the parallel-connection battery groups according to an accumulation result of the accumulation circuit.

5. The electronic device according to claim 4, wherein
   the charging controller reads the accumulation result of the accumulation circuit;
   the charging controller sets a charging voltage and a battery charging status according to the accumulation result; and
   the charging controller repeats the above steps until the parallel-connection battery groups reaches the battery charging status.

* * * * *